(12) United States Patent
Brodie

(10) Patent No.: US 6,219,541 B1
(45) Date of Patent: *Apr. 17, 2001

(54) CELLULAR RADIO SYSTEM

(75) Inventor: Iain Richard Brodie, Suffolk (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,601

(22) Filed: Nov. 24, 1997

Related U.S. Application Data

(63) Continuation of application No. 08/701,453, filed on Aug. 22, 1996, now abandoned, which is a continuation of application No. 08/188,415, filed on Jan. 24, 1994, now abandoned.

(30) Foreign Application Priority Data

Dec. 7, 1993 (GB) ................................. 93309831

(51) Int. Cl.⁷ ...................................... H04Q 7/20
(52) U.S. Cl. .................... 455/422; 455/447; 455/449; 455/450; 455/453; 455/509
(58) Field of Search ................... 455/422, 446, 455/447, 448, 449, 450, 451, 452, 453, 454, 509, 524, 62, 63

(56) References Cited

U.S. PATENT DOCUMENTS

| | | | | |
|---|---|---|---|---|
| 5,034,993 | * | 7/1991 | Sasuta et al. | 455/11 |
| 5,081,671 | * | 1/1992 | Reith et al. | 379/60 |
| 5,111,534 | * | 5/1992 | Benner | 455/33.2 |
| 5,319,796 | * | 6/1994 | Grube et al. | 455/33.4 |
| 5,363,428 | * | 11/1994 | Nagashima | 379/58 |
| 5,402,523 | * | 3/1995 | Berg | 455/33.4 |
| 5,437,054 | * | 7/1995 | Rappaport et al. | 455/33.1 |
| 5,448,621 | * | 9/1995 | Knudsen | 455/453 |
| 5,448,754 | * | 9/1995 | Ho et al. | 455/63 |
| 5,546,443 | * | 8/1996 | Raith | 379/59 |

FOREIGN PATENT DOCUMENTS

| | | | |
|---|---|---|---|
| A-0 534612 | 3/1993 | (EP) . | |
| 2234649 | * 2/1991 | (GB) | 455/33.4 |
| WO-A-92 04796 | 3/1992 | (WO) . | |

OTHER PUBLICATIONS

Sallberg et al. Hybrid Channel Assignment and Reuse Partitioning in a Cellular Mobile Telephone System, Jun. 1, 1987 pp. 405–411.*

IEEE International Conference On Communications, vol. 3, Jun. 14, 1992, Chicago, Illinois; pp. 1703–1709; Yum et al., "Hot–Spot Traffic Relief In Cellular Systems."

* cited by examiner

Primary Examiner—Lee Nguyen
(74) Attorney, Agent, or Firm—Nixon & Vanderhye, P.C.

(57) ABSTRACT

A cellular radio system includes three neighboring cells A3, A2, A1 which each have a number of channels (1 to 13, 14 to 26, 27–39 respectively) allocated for their use. A microcell M contained within cell A1 is served by a separate base station. The microcell has available to it channels 1 to 6 and 21 to 26 from the allocations of neighboring cells A2 and A3. The base stations A2, A3 and M are controlled such that no channel is in use simultaneously in both the microcell M and cell A2 or A3. This arrangement allows channels to be reallocated between neighboring cells according to demand, without reducing the peak capacity in individual cells.

13 Claims, 2 Drawing Sheets

CELLULAR RADIO SYSTEM

This is a continuation of application Ser. No. 08/701,453, filed Aug. 22, 1996, now abandoned; which is a continuation of application Ser. No. 08/188,145, filed Jan. 24, 1994, now abandoned.

BACKGROUND

I. Field of the Invention

This invention relates to cellular radio systems, and in particular to channel-assignment arrangements for such systems.

II. Related Art and Other Considerations

In cellular radio systems a number of base stations are provided which, between them, provide radio coverage for the area to be served by the system. A mobile radio unit within the service area can make radio contact with the base station having the strongest signal, which is usually the nearest. As the mobile unit travels through the service area, the mobile unit may get further from this base station so that the signal strength on this first radio link deteriorates. Cellular systems provide arrangements whereby communication can then be established with a second base station, the link with the first being relinquished. This process is known as "handover". Each mobile unit requires a separate channel to be assigned in order to communicate with a base station. A channel is assigned to the link between the mobile unit and the base station when communication is to be set up, the channel being selected from chose allocated for use by the base station and available for setting up a link (i.e. not currently assigned to a link. The different channels may be frequencies, time slots within a frequency, or some other division of the spectrum.

In order to avoid co-channel interference, particularly at boundaries between cells, each cell must have available to it a channel or group of channels which is different from those allocated to its neighbours. Considerable research has gone into optimising re-use patterns of these channels, to determine how close together two cells using the same channels can be without causing significant co-channel interference, thereby allowing the most efficient use of the spectrum. However, a major problem is that different cells have different traffic levels at different times of day, not always on a predictable basis, and the capacity requirements have to be based on the busiest period of each cell, even when these peak times do not coincide. This can result in channels being idle in one cell despite there being heavy demand in nearby cells.

To take a particular example, a cell serving a transport centre such as a railway station is likely to be at its busiest during the peak travel hours. The number of channels which need to be allocated to that cell in order to achieve an acceptable call success rate is determined by the call traffic density at the peak time. None of these channels can be re-used in any other neighbouring cell (i.e. one not necessarily adjacent to the first cell, but close enough for co-channel interference to be a possibility). However, a neighbouring cell may have a peak traffic density at another time of day. This must also be given a channel allocation sufficiently great to handle its peak density. The result is an inefficient use of the available channels, as at any time of day there is spare capacity in one or other of the cells.

Dynamic reconfiguration of the basic channel allocation scheme in neighbouring cells, in order to match changes in demand, is liable to have knock-on effects on further cells unless strictly controlled. Any such reconfiguration must also take place promptly to react to sudden surges in demand. Regular shifts in demand could be handled automatically by switching channels from one cell to another at predetermined times of day but this can only cope with predictable shifts in demand. Moreover, if a block of channels is shifted at a set time, any calls operating on a channel when it is shifted could be lost.

It is known from PCT patent application number WO91/01073, in the name of Telecom Securicor Cellular Radio Ltd, to provide a cellular radio system using time division multiple access in which each sector of a cell structure is subdivided into two sub-sectors. When communication is set up between a mobile unit and the base station the required time slot is transmitted only within the sub-sector in which the mobile unit is located. This reduces the amount of power required and reduces the possibility of co-channel interference since a more highly directional antenna can be used. The receive antenna at the base station can also be made more directional with similar benefits.

This prior art arrangement reduces the likelihood of co-channel interference and reduces the transmitter power required at the base station. However, it does not increase the overall capacity of any sector.

Because it assigns individual time slots it is also limited to a situation where the base stations are co-located, since synchronisation would otherwise be a problem.

In areas in which for reasons of topography and/or radio traffic density the basic cell structure would not provide an adequate service, it has been proposed to provide microcells. A microcell covers a smaller area than that covered by a typical macrocell of the basic cell structure. Consequently microcell base stations can be of lower power than the base stations of macrocells. Nevertheless, there is a problem in selecting channels for use by the microcell which do not interfere with any channels in use in nearby cells.

SUMMARY

The present invention seeks to provide extra capacity for one cell of a network with the minimum of disturbance to the overall channel allocation scheme and without reducing the maximum capacity of the neighbouring cells. The channels to be assigned may be frequencies, time slots on a given frequency, or some other division of the available spectrum. In this system each cell retains its maximum capacity, but it can be used by another cell when not needed by the first cell.

According to a first aspect of the invention, there is provided a method of assigning channels in a mobile radio system having a plurality of base stations, each base station serving a cell of the system, and wherein a first pool of channels is allocated to a first base station serving a first cell which contains a second, smaller, cell served by a second base station, and wherein a second pool of channels is allocated to a group of base stations including the second base station and, the method comprising controlling the group of base stations such that the channels of the second pool can each be assigned to only one of the group of base stations at any one time.

According to a second aspect of the invention, there is provided a mobile radio network comprising a plurality of base stations, wherein a group of the base stations serving at least a first macrocell and a microcell contained within a macrocell each have means to establish radio communication with mobile radio units operating within their respective cells, including means of selecting for such communication any of a pool of channels, available for use by all members of the group of base stations, which is not currently in use.

According to a third aspect of the invention, there is provided a controller for controlling the plurality of base stations of a network of the kind referred to above comprising means for identifying that a first base station requires a channel for radio communication with a mobile unit, means for identifying which of a plurality of channels are currently available for use by the base station, means for allocating to the first base station one of the available channels, and means for identifying a channel currently in use by the first base station as not being currently available for use by any of the other base stations.

According to a fourth aspect of the invention, there is provided a method for assigning channels for a mobile radio network characterised in that at least one of the base stations of the network has available to it a plurality of pools of channels each shared with a different cooperating base station or group of cooperating stations, the channel assignment system being arranged such that the first base station is allocated a channel from the common pool of channels having the greatest number of available channels. This arrangement ensures no cell has no channels available when another cell has several.

According to a fifth aspect of the invention, there is provided a mobile radio network comprising a plurality of base stations, at least a first base station having available to it a plurality of pools of channels each shared with a different co-operating base station or group of co-operating base stations, characterised in that means are provided for allocating a channel to the first base station from the pool of channels having the greatest number of available channels.

According to a sixth aspect of the invention, there is provided a controller for controlling a plurality of base stations of a network of the kind described above comprising means for identify that a channel is required by a first base station, means for identifying the pool of channels available for use by that base station that has most channels available and means for instructing the first base station to operate on that channel.

All these arrangements require only limited cooperation between base stations. In particular, it is only necessary for each base station to have information on which of the common pool of channels is in use by the other base stations sharing that pool. In a particularly advantageous arrangement the macrocells are two cell sectors which each share channels with a microcell, which is itself located within a third sector. In such a case the base stations for the three sector may be co-located. The microcell antenna may be remote from but controlled from the same site as the sector base stations, so their cooperation requires no additional signalling overhead on the network.

The disturbance to the overall reuse pattern of the cell pattern is minimised, since only the three sectors closest to the microcell are affected.

In some situations there is a requirement for a minimum level of availability of channels in each cell to be satisfied at all times. Therefore, in one embodiment of the invention at least one of the base stations also has available to it a dedicated pool of channels. The channel assignment system can be arranged such that one of the common pool of channels is only assigned to that base station if none of the dedicated pool of channels are available.

BRIEF DESCRIPTION OF THE DRAWINGS

This invention will now be further described by way of example only with reference to the figures, in which.

DETAILED DESCRIPTION OF THE DRAWINGS

In this example, the invention is used to provide a channel allocation for a microcell located within a macrocell of a cellular radio system in order to provide extra capacity at a location with a high peak call traffic density.

Figure 1:
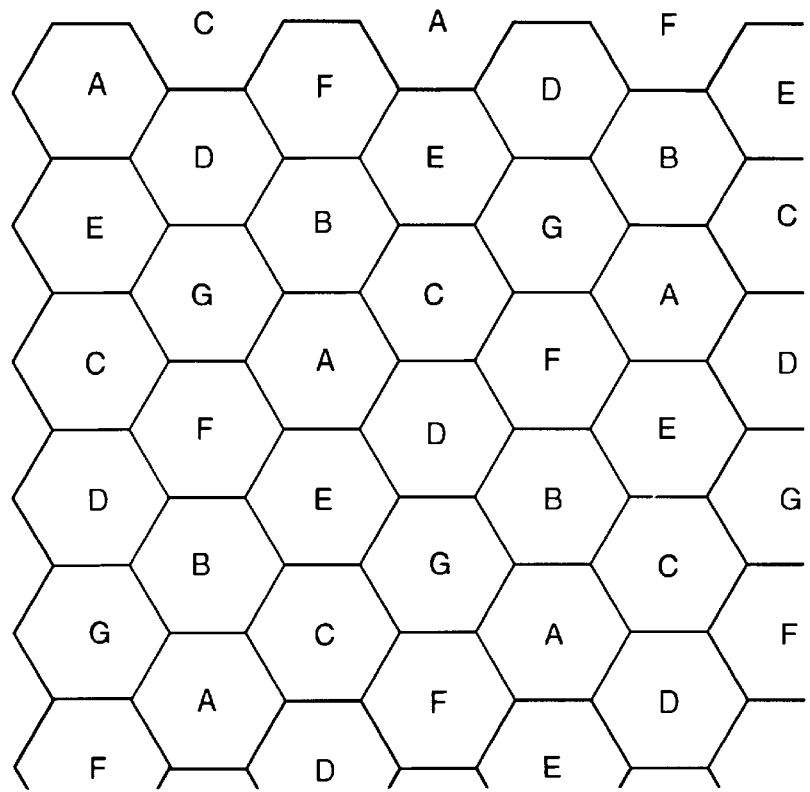
FIG. 1 shows schematically a channel allocation scheme in a cellular radio system to which this invention may be applied.

FIG. 1 is an idealised diagrammatic representation of part of a cellular radio system, illustrating a channel allocation system. It shows the service area of the cellular radio network divided into cells each served by a base station. Each cell is shown in the figure to be a regular hexagon, although in practice the array will not be regular because of practical considerations such as base-station siting and power, which are selected to suit local topography and call traffic density. It will also be appreciated that cell boundaries are in practice zones rather than lines.

Each cell in this idealised array is allocated one of seven groups of radio channels. Cells allocated different groups of channels are identified by the different letters A, B, C, D, E, F or G, and cells allocated the same group of channels are all identified by the same letter. It can be seen from FIG. 1 that each cell (for example any cell A) is surrounded by six other cells B, C, D, E, F, G none of which has the same channel allocation. The nearest cell with the same channel allocation (i.e. the nearest cell A) is separated from the first cell A in any direction by two other cells. In this idealised situation simple geometry gives a distance between base stations using the same frequencies of $\sqrt{7}$ (approximately $2\frac{2}{3}$) times the distance between adjacent base stations. At such a distance acceptable coverage can be achieved near cell boundaries whilst keeping co-channel interference between stations at an acceptable level.

Figure 2:
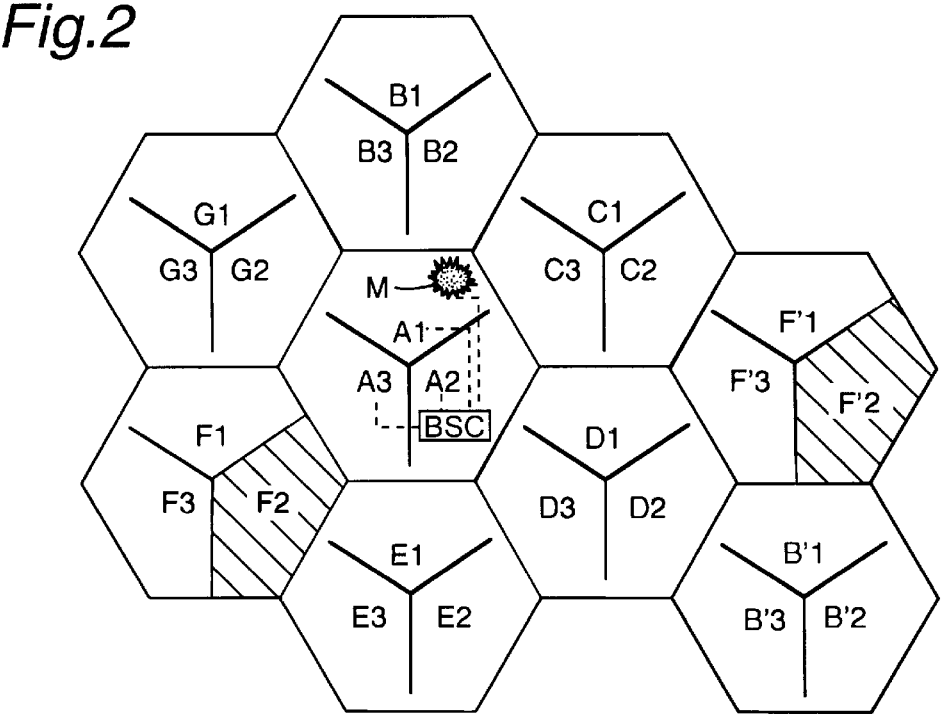
FIG. 2 shows schematically a group of cells in the cellular system of FIG. 1 in more detail.

FIG. 2 shows in more detail nine cells A, B, C, D, E, F, G, B' and F'. Cells B' and F' are allocated the same channels as cells B and F respectively. Each cell is divided into three sectors, each having its own channel sub-allocation from the main allocation of that cell. These sub-allocations are denoted by suffixes 1, 2, 3, to each identification letter. This sectorisation of the cells reduces co-channel interference further, because for example sector F2 is further from sector F'2 than the minimum distance between cell F and cell F'. Sectorisation therefore improves channel re-use and also allows directional rather than omnidirectional transmitters to be used, since each transmitter only needs to cover one-third of the total area of the cell. The use of directional transmitters means that lower power outputs can be used than with omnidirectional transmitters.

This cell and sector structure is the basic macrocell structure of the system.

In this illustrative example there is, within the coverage area of sector A1, a traffic 'hotspot' in which, at certain times, a call traffic density significantly higher than the average for the network is experienced. Sector A1 is unable to handle the total traffic on offer at busy times, so an additional local transmitter is provided to handle the extra traffic. The area of coverage of the local transmitter is shown as microcell M.

A difficulty arises in allocating channels for the microcell M. Clearly none of the channels allocated to macrocell A1 can be used, since this would not provide any increase in capacity for the macrocell as a whole. Moreover, channels already in use in other sectors of cell A, or in its neighbours B, C, D, E, F and G, cannot be used without introducing co-channel interference. The use of special channels, not allocated to the main re-use pattern, for microcells is possible, but is an inefficient use of the available spectrum.

Embodiments of the invention, using this structure, will now be described.

In one arrangement according to the invention microcell M uses channels pooled with the adjacent sectors A2 and A3, the channels being allocated to the three cells dynamically according to demand. The base stations are in communication with each other to ensure that no channel is used by two base stations simultaneously. This is particularly easy to implement if the base stations are co-located. This will generally be the case for base stations A2 and A3 serving adjacent sectors. Base station M may be some distance away but in most architectures it would be linked to station A1, which would be co-located with the other sectors' base stations.

However, this arrangement could result in unnecessary blocking (call failure due to unavailability of channels) when a pool is in full use but one of the other cells having access to the pool has other channels available to it not in use. A number of alternative embodiments, comprising methods of assigning channels to minimise blocking, are discussed below.

Figure 3:
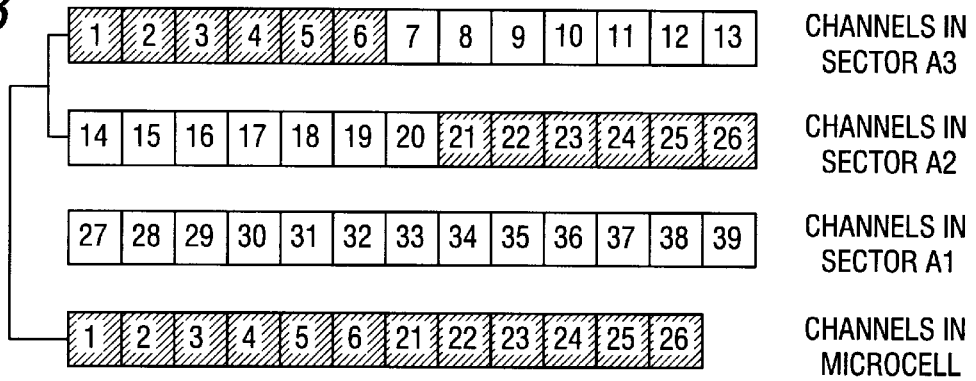
FIG. 3 shows diagrammatically a channel allocation scheme according to the invention for three macrocells A1, A2, A3 and a microcell M.

In FIG. 3 a channel allocation scheme is shown for the sectors A1, A2 and A3. Each sector has thirteen channels allocated to it, sector A3 having channels 1 to 13, sector A2 having channels 14 to 26 and sector A1 having channels 27 to 39. In practical channel allocation schemes adjacent channels 35 in the spectrum are not allocated to the same cell, to minimise the likelihood of interference between adjacent channels. The numbers used here are not intended to signify the relative positions of the channels in the spectrum.

The microcell is located in sector A1 and has twelve channels available. It shares channels 1 to 6 with sector A3, and channels 21 to 26 with sector A2. The choice of channels for this pool is made in such a way as to minimise inter-channel interference. For example the pool may consist of the six lowest frequencies available to sector A3 and the six highest available to sector A2.

In a first arrangement the microcell, when it requires a channel, selects an unused one from those available to it. Sectors A2 and A3 have some channels 7 to 13, 14 to 20 not available to the microcell i.e. reserved for the exclusive use of these sectors or for pooling with other microcells. Within the microcell a mobile unit is also in range of the base station serving sector A1 which will continue to meet part of the traffic demand within the microcell.

In most current systems when a communication link is required either for a handover or for establishing a new call, a base station can select any channel from those available to it. No preference is made between channels. Whilst this is satisfactory when all channels can be used in the same way, in the above embodiment it can be seen that the use of channels 1 to 6, 21 to 26 by the sectors A2 and A3 would deprive microcell M of their use, but the use of channels 7 to 20 would not. To avoid this problem, in a first modification of the described embodiment, it is arranged that when macrocell A3 requires a channel, one of the channels 7 to 13 reserved for its exclusive use is selected if such a channel is available. Only if no other channel is available is a channel selected from those channels 1 to 6 pooled with the microcell M. This means that the macrocell does not exclude the microcell from using a pool channel unless the macrocell has no spare capacity.

Figure 4:
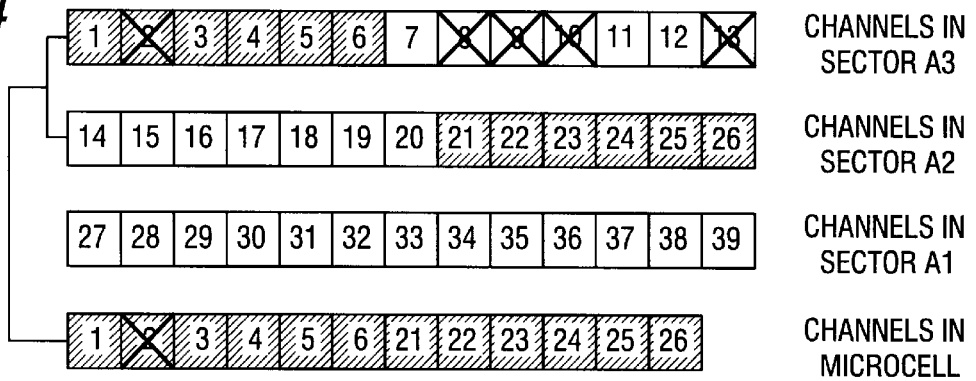
FIG. 4 illustrates diagrammatically how the channels are selected in a modification of the invention.

In FIG. 4, channels 8, 9, 10 and 13 (denoted by an X) are in use by sector A3. Channel 2 is also in use, but by the microcell. If channels were assigned to mobiles arbitrarily the next channel to be assigned to sector A3 might be one of the 'pool' channels 1, 3 to 6, or one of sector A3' s 'exclusive' channels 7, 11, 12. In fact, in this example the probability is greater than 50% that it will select a pool channel as more of these are available. To avoid depriving the microcell of this pool channel the base station of sector A3 is arranged so that it selects one of its exclusive channels 7 to 13 if one is available.

Figure 5:
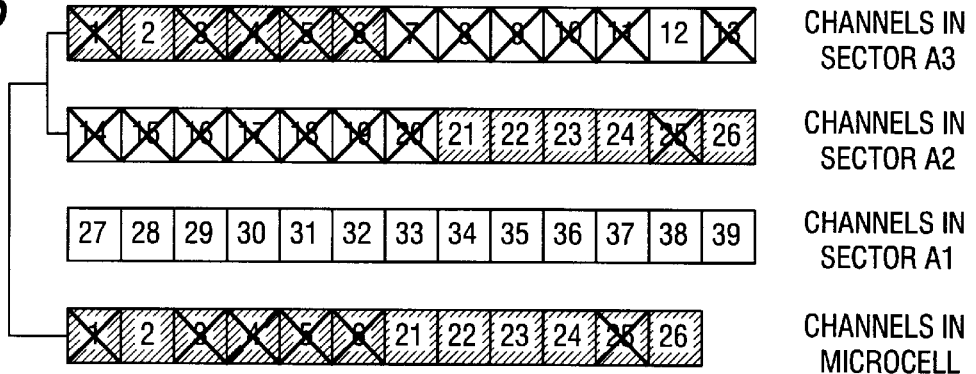
FIG. 5 illustrates diagrammatically how the channels are selected in another modification of the invention.

In a further modification to the invention, illustrated in FIG. 5, the microcell co-operates with two or more macrocells and selects a channel for use from the pool having the most channels available. This reduces the chance of the microcell taking the last available channel from one pool, preventing its use by the co-operating macrocell, when several channels are still available in another pool also available to the microcell.

In the example shown in FIG. 5, the microcell has six channels available: five channels (21 to 24 and 26) from the sector A2 pool, but only one (channel 2) from the sector A3 pool. (It is immaterial whether it is the microcell or the sector which is using a given pool channel). In this example the microcell will use one of the channels 21 to 24 or 26 (selected at random) but will not use channel 2, since the pool of which channel 2 is a member is currently more heavily used.

It should be noted that at times a sector may nevertheless be using a pool channel even though non-pool channels are available, despite the arrangements described above. This will occur if all non-pool channels were in use at the time the call was set up, but some became available during the duration of a call.

In a refinement of the described system, the control system may periodically monitor the channel usage and, should it find a mobile using a pool channel when a non-pool channel is available, hand the mobile over to the non-pool channel in order to make the pool channel available.

Within the microcell M a mobile unit requiring connection will have channels 1 to 6 and 21 to 26 available from the microcell base station M, and channels 27 to 39 available from base station A1. As is conventional, if a mobile unit is in range of two base stations communication is established with the stronger one. Therefore, if microcell pool channels are available, the mobile will be assigned one of those, leaving channels 27 to 39 free for use by mobiles elsewhere in cell A1. If no pool channels are available, the mobile will be assigned a channel from the nearest base station, namely A1.

Table 1 gives the results of applying these techniques in a simulated traffic situation. The results are given for eight situations. The first five are for traffic patterns when traffic density in the microcell is three times that in the rest of the cell array (which is otherwise uniform). (It should be noted that the microcell occupies only one tenth of the area of sector A1, so the total traffic on offer in any one sector is still greater than that in the microcell).

The last three situations illustrate the position when the traffic density is the same throughout. It is important that the presence of the microcell does not seriously affect the level of service in the other sectors at such times.

The comparisons are given for two 'control' situations of
1) no microcell, and
2) a 'blind' microcell (i.e. using channels in common with A2 and A3 regardless of whether they are already in use).

These are compared with the three arrangements discussed above
3) microcell choosing free channels from pool (FIG. 3),
4) macrocell preferentially using non-pool channels (FIG. 4), and
5) microcell using channels from the pool with most channels free. (FIG. 5).

The conditions for the simulation were:
13 channels per sector
microcell has 6 channels in common with each of A2 and A3.
Average traffic level 7.4 Erlangs/sector
microcell has approximately 10% of the area of sector A1, and 3 times its traffic density per unit area.

Measurements are made of the overall 'blocking' levels, i.e. the percentage of attempts to complete a connection which are prevented because no suitable channel is available in the individual macrocells A1 (column a), A2 and A3 (column b), and the microcell (column c), and the resulting lost traffic (which is the total of the three sectors and the microcell, (expressed in Erlangs rather than as a percentage) (column d). This figure is 7.4 Erlangs×(col 1+2×col 2+0.3× col 3)/100. The weighting factors of 2 and 0.3 reflect the different areas represented by these columns, column 2 representing sectors A2 and A3, each having the same size as sector A1, whilst column 3 represents the microcell M whose total traffic is 0.3 of that of sector A1.

It will be seen from the table that a significant reduction in the amount of lost traffic (from 1.24E to 0.88E) is achieved by allocating unused channels from adjacent sectors. (An even greater reduction, to 0.31, is achieved in the 'blind' microcell situation, but this uses some channels twice, in the microcell and one of the sectors, leading to unacceptable interference.) Smaller additional improvements are achieved by preferentially allocating non-pool channels in the sectors and allocating channels to the microcell from the pool with most channels available.

Although the overall blocking level is reduced by this method, some additional blocking occurs in the sectors A2 and A3. This level rises from 1.88% if no microcell is present, (and therefore no channels can be taken from sectors A2 and A3) to 4.56 in the worst-case situation (preferential allocation of non-pool channel to macrocell— since this gives the microcell the greatest opportunity to seize the pool channels so that they are then not available to the macrocell.) This situation is significantly improved if the microcell selects channels from the pool with more available channels, since this reduces the chances of depletion of the other pool.

It is important that the system does not cause a serious degrading of service at times (probably most of the time) when the traffic demand in the microcell is low. As can be seen from the table, the effect of the arrangement is that blocking in sectors A2 and A3 is marginally increased if the macrocell preferentially uses the non-pool channels, but this effect is more than balanced by the improvement in the microcell if it selects a channel from the pool with more available. In both cases there is an overall reduction in the amount of traffic lost.

What is claimed is:
1. A method of assigning channels in a mobile radio system having a plurality of base stations, each base station serving a cell of the system, the method comprising:
allocating a first pool of channels to a first base station serving a first macrocell,
using a second base station to serve a microcell contained in the first macrocell,
allocating a second pool of channels to a group of base stations including the second base station but not including the first base station, and
providing coordinated control of the group of base stations such that the channels of the second pool can each be assigned to only one of the group of base stations at any one time.
2. A channel assignment method as claimed in claim 1, further comprising:
allocating to at least one of the base stations a dedicated pool of channels, and
assigning one of the second pool of channels to the at least one of the base stations assigned the dedicated pool of channels only if none of the dedicated pool of channels are available.
3. A channel assignment method as claimed in claim 1, further comprising:
making available to at least one of the base stations a plurality of pools of channels each shared with a different co-operating base station or group of co-operating base stations,
assigning to the at least one of the base stations a channel from the pool having the greatest number of available channels.
4. A method according to claim 3, wherein the first cell served by the first base station is a macrocell, further comprising providing second and third base stations serving macrocells, each of the second and third base stations sharing channels with a base station serving a microcell located within the macrocell served by the first base station.
5. A channel assignment method as claimed in claim 1, further comprising providing communication of the group of base stations with one another to ensure that no channel in the second pool of channels is used by two base stations simultaneously.
6. A mobile radio network comprising a plurality of base stations, wherein a group of the base stations serving at least a first macrocell and a microcell contained within a second macrocell each has means to establish radio communication with mobile radio units operating within their respective cells, including coordinated means of selecting for such communication any of a pool of channels, available for use by all members of the group of base stations but not available by a base station serving the second macrocell, which is not currently in use.
7. A mobile radio network according to claim 6 wherein at least one of the base stations has available to it channels from at least two pools shared with different base stations or groups of base stations, and having means for selecting a channel from the pool which has most channels available.
8. A mobile radio network as claimed in claim 5 wherein at least one of the base stations to which a shared pool of channels is available, also has available to it a further pool of channels not available to other members of the group, the channel selection means of the base station being arranged to select a channel from the shared pool only if none of the further pool of channels is available.
9. A mobile radio network as claimed in claim 6, wherein at least some of the group of base stations are located together and share control functions.

10. A controller for controlling the plurality of base stations of a network according to claim 6 comprising means for identifying that a first base station requires a channel for radio communication with a mobile unit, means for identifying which of a plurality of channels are currently available for use by the first base station, means for allocating to the first base station one of the available channels, and means for identifying a channel currently in use by the first base station as not being currently available for use by any of the other base stations.

11. A controller according to claim 10, wherein the channels available are allocated to pools each available to a subset of the group of base stations, at least one of the base stations having access to more than one of the pools, wherein when one of the at least one of the base stations requires a channel, the controller allocates hereto a channel from the pool which has most channels available.

12. A controller according to claim 9 further comprising means for instructing the first base station to communicate with the mobile unit on a channel not available to other base stations if such a channel is available.

13. A method of assigning channels in a mobile radio system having a plurality of base stations, the method comprising:

dividing an area into a plurality of macrocells and allocating a unique group of channels to each macrocell;

dividing a macrocell into a plurality of sectors and establishing a plurality of sector base stations, at least one sector base station in each sector, and assigning to each sector base station a unique sector set of the channels of the group of channels assigned to the macrocell;

establishing a microcell contained in one of the macrocells and allocating channels to a microcell base station for the microcell by creating a microcell pool of channels, the microcell pool of channels including portions of at least two of the sector sets of channels;

managing assignment of channels of the microcell pool and of at least two sector sets of channels to facilitate availability of channels to the microcell base station and to at least one of the sector base stations.

* * * * *